March 26, 1929.  C. F. BALL  1,706,473
TRACTION TREAD
Filed Jan. 23, 1923  2 Sheets-Sheet 1
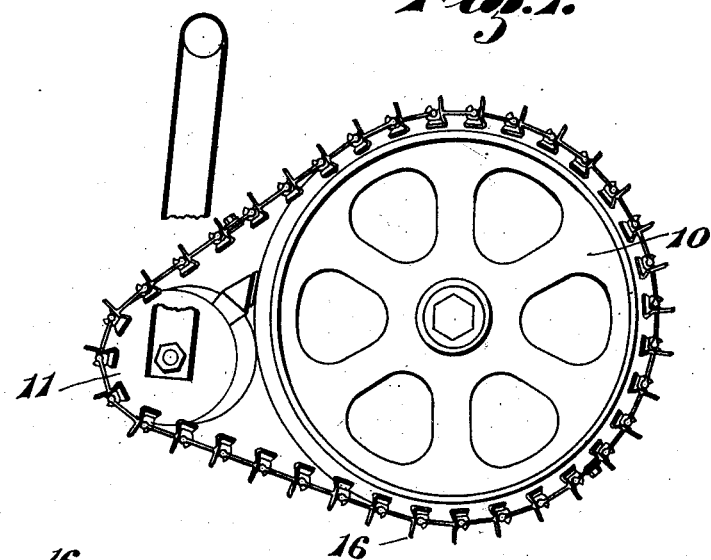
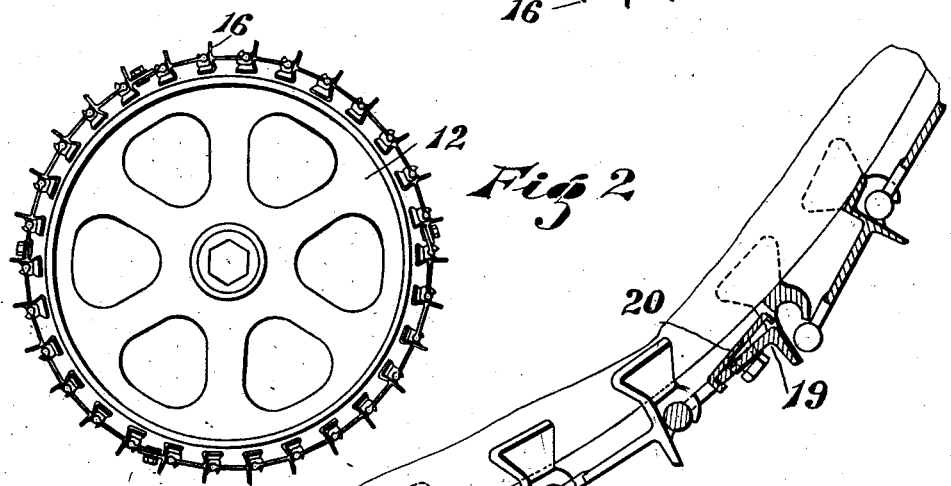
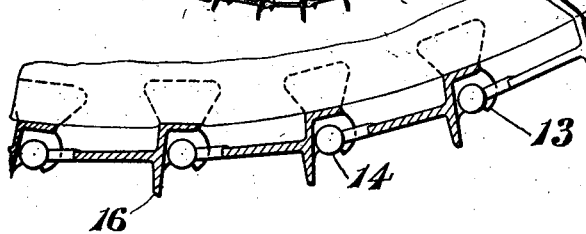
INVENTOR.
CHAS. F. BALL.
BY Dewey, Strong,
Townsend and Loftus
ATTORNEYS.

March 26, 1929.  C. F. BALL  1,706,473
TRACTION TREAD
Filed Jan. 23, 1923  2 Sheets-Sheet 2
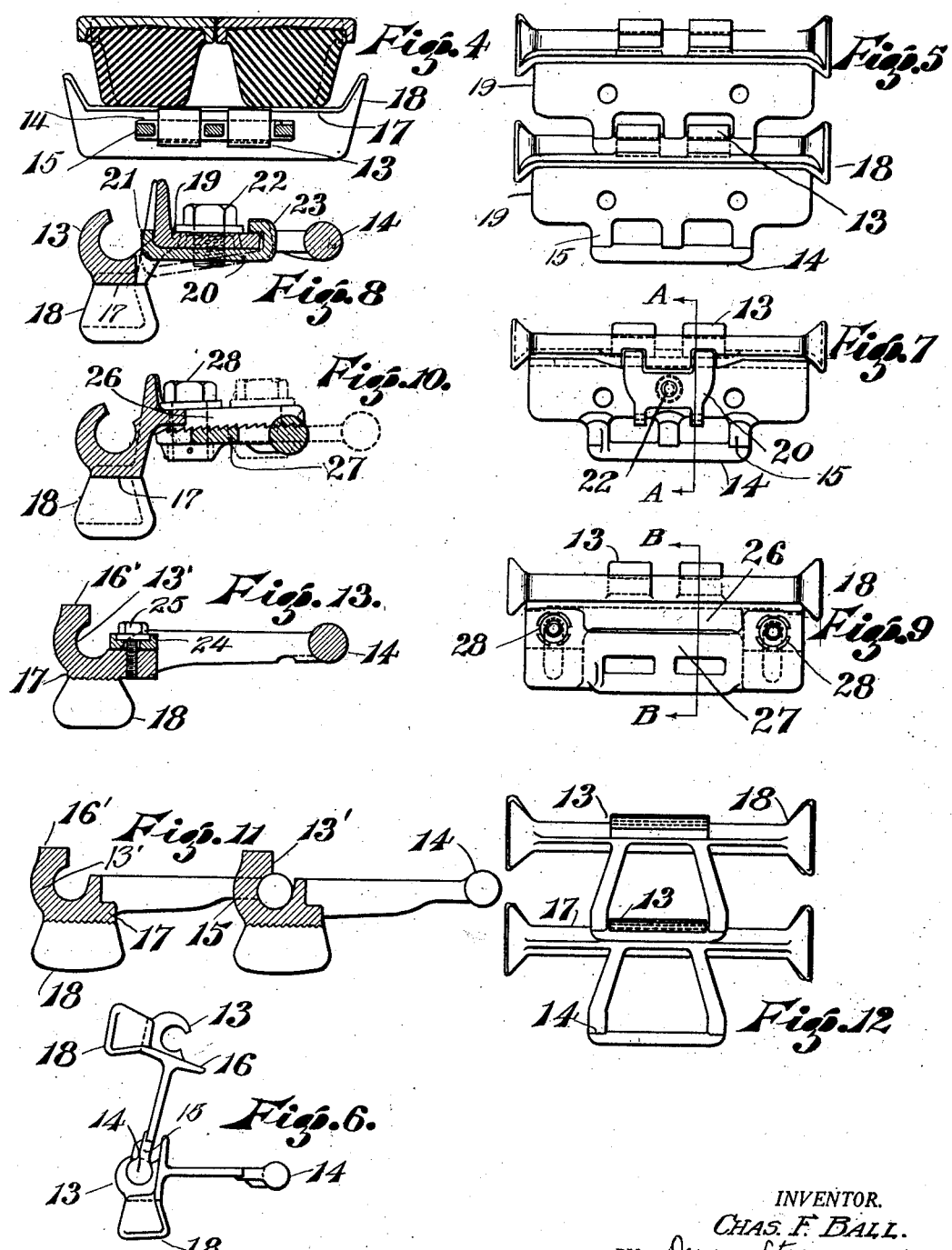
INVENTOR.
CHAS. F. BALL.
BY
ATTORNEYS.

Patented Mar. 26, 1929.

1,706,473

UNITED STATES PATENT OFFICE.

CHARLES F. BALL, OF MILWAUKEE, WISCONSIN.

TRACTION TREAD.

Application filed January 23, 1923. Serial No. 614,385.

This invention relates to a traction tread or chain track for use with either round wheels or track-laying types of vehicles.

The object is to simplify and improve the construction and operation of a chain track of this type, and more particularly to adapt such a track or tread for use on rubber tired wheels.

In the accompanying drawings:

Fig. 1 shows a side elevation of a track laying attachment fitted with a chain track embodying one form of my invention.

Fig. 2 shows a side elevation of a round wheel fitted with a similar track.

Fig. 3 shows a central, longitudinal, sectional view of a portion of the track.

Fig. 4 shows a cross sectional view through one of the links and a portion of the tire.

Fig. 5 shows an outer plan view of a pair of connecting links.

Fig. 6 shows a side elevation of two of the links illustrating the manner in which they are connected and disconnected.

Fig. 7 shows an inner plan view of one of the coupling links.

Fig. 8 shows a sectional view of the same taken on the line A—A of Fig. 7.

Fig. 9 shows an inner plan view of an adjustable link employed in the track.

Fig. 10 shows a sectional view taken on the line B—B of Fig. 9.

Fig. 11 shows a longitudinal, sectional view of track links embodying a modified form of my invention.

Fig. 12 shows a bottom view of the links illustrated in Fig. 11.

Fig. 13 shows a sectional view of a coupling link embodying a modified form of my invention.

The present track is primarily designed as an attachment for rubber tired vehicles. In Fig. 1 it is applied to an endless tread, being carried by one of the driving wheels 10 and an idler wheel 11. In Fig. 2 it is shown as applied to a round wheel 12.

The track comprises a series of pivotally connected links, each having a hook 13 at one end and a bail-shaped member 14 at the opposite end integrally formed. The diameter of the cross rod of the bail is larger than the mouth of the hook, but one end of the bail is reduced in thickness, as shown at 15, so that it will slide endwise into the hook of an adjacent link when the two links are turned so as to form an angle outside the perimeter of the track, as illustrated in Fig. 6, at which time the sides of the bail are opposite the open mouth of the hook. When, however, the links are moved in a straight line or inwardly so as to form an angle inside the perimeter of the track, the bail is prevented from slipping out of the hook endwise by reason of its sides contacting with the sides of the hook.

At the base of the hook there is formed a downwardly extending lug 16 constituting a grouser. Overlying each hook is a narrow, transversely extending bar 17 projecting beyond the sides of the hook and having upturned ends 18. This narrow, transverse member contacts with the rubber tire and forces its way into the tire, thus giving a sort of tooth action, which affords a more positive drive. The upturned ends 18 serve to prevent the track from being displaced from the tire in a lateral direction. If desired, each link may be provided with a shoe 19 at its bottom, as shown in Figs. 3 to 10, inclusive.

To facilitate assembly of the track one or more coupling links, as shown in Figs. 7, 8 and 13, are employed. This coupling link is similar to the track links already described, except that the mouth of the hook is made larger than the diameter of the cross bar of the bail, so that the latter can be inserted directly therein when in any position.

The bail is held in place within the hook by means of a keeper, which, as shown in Figs. 7 and 8, is in the form of a stirrup 20 fitted over the inside of the shoe 19 and having an end portion 21 which projects through an opening at the base of the hook to partially close the mouth of the latter. The stirrup is held in place by a bolt 22 passing through the shoe and the said stirrup is further held against displacement by the provision of a hook-shaped end 23 to fit around the end of the shoe opposite the hook. As shown in Fig. 13 the keeper is in the form of a block 24 which is mounted on a clamping bolt 25, the latter being secured to the under side of the shoe or transverse rib.

Some adjustment for taking up slack, etc. is also desirable in a track of this kind and I provide for this by inserting at intervals in the track an adjustable link, such as shown in Figs. 9 and 10. This link is similar to the links already described except that it is made in two parts, one part consisting of the hook section being formed with a serrated plate 26 and the other part consisting of the bail section being formed with a serrated plate 27. These two plates fit side by side with their serrated faces contacting and are held in any desired position of adjustment by means of clamping bolts 28. By placing several of these adjustable links in the track provision can be made for an adjustment of more than the pitch of one link. The usual adjustment of the idler wheel in the track-laying attachment can, therefore, be omitted where these adjustable links are employed.

As shown in Figs. 11, 12 and 13, the shoe 19 may be omitted and the grouser 16' may be provided by an extension of the hook members 13'.

In the operation of the track the narrow, transverse ribs in contact with the rubber tire of the driving wheel will deform the tire in such a way as to give a more or less positive driving action as between the driving wheel and the track. Where the links include the shoe 19, as shown in Fig. 3, the rest of the tire will contact therewith, but where the links are left open at the bottom, as shown in Fig. 11, a part of the load pressure will be transmitted direct to the ground. The lugs 16, 16' located as they are directly beneath the elevated ribs 17 will receive the greater portion of the load pressure and will be forced into the ground so as to give increased traction. These lugs can be sharpened, if desired, for operation over ice. Even where the shoe 19 is provided there is an open space formed where the bail-shaped member 14 connects with the shoe, and therefore the action of the tire in rolling over the track will force mud and dirt through these openings so as to keep the track clean.

The upturned ends 18 are preferably flared, to reduce the size of the open space between adjacent links in order that the wheels may not run off the track. At the same time there is sufficient open space below these flared ends to allow for the escape of mud and dirt.

Among the advantages of a track such as I have shown and described are:

(1) Facility of connecting and disconnecting the links by reason of the interlocking hooks and bails.

(2) The positive driving engagement between the rubber tire and the track afforded by the tooth action of the narrow, transverse rib overlaying the hook and grouser.

(3) Provision for keeping the track on the tire through the upturned ends 18.

(4) Simplicity of coupling the final links through the movable keeper in co-operation with the hook.

(5) Ease and facility of adjusting the length of the track through the adjustable links, and Finally, the track is exceedingly inexpensive to construct, all parts of the links being integral.

This application is a continuation in part of my co-pending application Serial No. 356,168, filed February 4, 1920, upon which Patent No. 1,502,009 was granted on July 22, 1924.

Various changes in the construction and arrangement of the several parts herein shown and described may be employed without departing from the spirit of my invention as disclosed in the appended claims.

Having thus described my invention, what I claim and desire to secure by Letters Patent is:—

1. An endless traction tread for use on vehicle wheels comprising a series of pivotally connected links, each link comprising a narrow bar for engagement with the tread of a vehicle wheel, a hook at the outer face of said bar and having a restricted mouth, a bail at the opposite end of said link, the cross bar and a side bar of said bail being, respectively, of greater and of less diameter than the mouth of said hook, whereby the bail of one link may be slid transversely into the hook of an adjacent link when the links are moved to form an outward angle bringing the side bar into transverse alinement with the mouth of the hook, one side wall of said hook being extended beyond the mouth thereof to constitute a grouser.

2. An endless traction tread for use on vehicle wheels comprising a series of pivotally connected links, each formed with a hook at one end and a bail at the opposite end, the diameter of the cross bar of the bail being greater than the mouth of the hook and one end of the bail being reduced in thickness to permit the bail to be fitted endwise into the hook of the adjacent link when the links are moved to form an outward angle, one of said links being made in two parts, one consisting of the hook and the other of the bail, and longitudinally adjustable means connecting said parts together.

3. An endless tread for vehicle wheels comprising a series of pivotally connected links, each having a hook at one end and a bail at the opposite end, the hook of one link being adapted to pivotally receive the bail of the adjacent link, a part of the hook being extended outwardly to form a ground-engaging lug.

4. An endless tread for vehicle wheels comprising a series of pivotally connected links, each having a hook at one end and a bail at the opposite end, the hook of one link being adapted to pivotally receive the bail of the adjacent link, a part of the hook being extended outwardly to form a ground-engaging lug, and an elevated transversely extending bar formed on top of the hook for contact with the tire of the wheel.

5. An endless tread for vehicle wheels comprising a series of pivotally connected links, each having a hook at one end and a bail at the opposite end, the hook of one link being adapted to pivotally receive the bail of the adjacent link, a part of the hook being extended outwardly to form a ground-engaging lug, and an elevated transversely extending bar formed on top of the hook for contact with the tire of the wheel, said bar having its ends upturned to prevent lateral displacement of the link from the tire.

6. An adjustable link for an endless track of the character described formed in two parts, one part carrying a hook-shaped portion and the other part carrying a bail-shaped portion, the two parts being overlapped and means for connecting them together in various positions of adjustment.

7. An adjustable link for an endless track of the character described comprising overlapping portions, the contacting faces of which are serrated, means for clamping the overlapping portions together in various positions of adjustment, a hook formed on one of the said portions and a bail-shaped member formed on the other portion.

8. A link for an endless track of the character described having a hook-shaped portion at one end and a bail-shaped portion at the opposite end, the hook being larger at the mouth than the diameter of the cross bar of the bail and a movable keeper to obstruct the mouth of the hook and means for clamping said keeper in place.

9. In an endless traction tread, a link having a connecting pin and another link having hooks to receive said pin, the hook being larger at the mouth than the diameter of the connecting pin, a movable keeper to obstruct the mouth of the hook and means for clamping said keeper in place.

CHARLES F. BALL.